Patented June 7, 1938

2,119,620

UNITED STATES PATENT OFFICE 2,119,620

PROCESS FOR CONCENTRATING RUBBER LATEX AND SIMILAR VEGETABLE JUICES

Ernst Benzing and Johannes Jaenicke, Frankfort-on-the-Main, Germany, assignors, by mesne assignments, to Revertex Limited, London, England, a corporation of England No Drawing. Application November 29, 1935, Serial No. 52,193. In Germany December 5, 1934

9 Claims. (Cl. 18—50)

This invention relates to a process for concentrating rubber latex and similar vegetable juices, and to the product of such process.

Heretofore attempts to produce rubber latex concentrates were made with pure rubber latex or with latex such as contained antiputrefactive agents. In this manner, but a slightly increased concentration could be obtained because coagulation very soon set in during the operation due to the fact that natural rubber latex contains non-rubber substances which counteract its powers of resistance to coagulating influences.

The object of the present invention is to treat the latex first by partially coagulating it and removing the coagulated matter thereby desensitizing the latex by eliminating those substances which render it susceptible toward coagulating influences and second by concentrating the desensitized latex previous to which concentrating, the desensitized latex may, if desired, be treated with adsorptive media by which treatment the content of sensitizing substances in the latex is still further reduced.

The present invention accordingly comprises first removing a portion of the sensitizing substances from the rubber latex and then concentrating the latter in known manner and in an alkaline or acid condition, for example by evaporation, creaming, centrifuging, filtering, or by several of these methods in combination. Particularly good results are obtained when the stability of the rubber latex is improved by adding stabilizing agents, such as protective colloids, in addition to removing the sensitizing substances. The stabilizing agents may be added before, during, or after concentration.

The non-rubber constituents which lower the stability of the latex may be removed, in accordance with this invention as follows. First, the alkaline or acid latex, treated with protective colloids and/or preservatives if desired, is partially coagulated and the coagulum separated, preferably by a sieve. In such case, the coagulants may consist for example, of electrolytes and/or non-electrolytes, such as alcohol or colloidal ferric oxide in a state of true or colloidal solution. Second, the remaining latex is treated with active charcoal, silica gel, aluminum oxide or ferric oxide by which any soluble non-rubber substances which counteract the powers of resistance to coagulating influence are adsorbed. Third, the latex thus desensitized is concentrated in any of the various methods mentioned above. If desired the second step, that of treating the latex with adsorbing media, may be omitted and the latex resulting from the first step concentrated directly. It is also possible to revert the order of the first two steps.

The desensitized latex is admirably adapted for the production of concentrates by evaporation because, in consequence of its exceedingly small content of substances that are sensitive to heat, it can be inspissated to form surprisingly stable concentrates, without skinning and coagulation, even without the addition of protective colloids.

The latex derived from latex which has been pre-treated in accordance with the present invention can be employed with advantage for the production of latex concentrates by centrifuging. In such case not only is the high degree of purity of the resulting cream of importance, but also the fact that the efficiency of the centrifuge is increased because, owing to the greater mechanical stability of the desensitized latex, the troublesome cleaning of the centrifuge, hitherto necessary after short working periods has to be undertaken only at comparatively rare intervals. Moreover, in the case of desensitized latex, the centrifuging can be easily performed at elevated temperature, which hitherto has been a matter of considerable difficulty owing to the known sensitiveness of latex to the influence of temperature.

Creaming also is facilitated by the desensitizing pretreatment of the latex in accordance with the present invention. The separation of serum is accelerated to a greater degree than in the case of untreated latex, and a cream characterized by a high rubber content and particularly low content of non-rubber constituents is obtained, together with a remarkably clear serum.

In respect of filtration properties, the pretreatment of the present invention also has an extremely favorable effect on the latex. Comparatively coarse deposits are obtained on the filter, and the pores of the latter become clogged far less rapidly than in the case of ordinary latex.

In the case of the latex concentrates produced in accordance with the present invention, the risk of decomposition by bacteria is lessened to an extraordinary degree, since the concentrates contain only fractional amounts of the decomposable substances normally present (proteids and carbohydrates in particular). This advantage of the present process finds expression in a sensible economy of preservatives.

Hitherto, it has been impossible in practice to produce concentrates with such a high degree of purity as is obtainable by the process of the present invention. It has already been proposed, it is true, to obtain very pure latex concentrates by removing a portion of the serum, by centrifuging, filtration or creaming, and to repeat these operations—after the addition of clean water in each case—until the separated sera contain the bulk of the non-rubber constituents. This procedure, however, is so expensive and complicated that it is suitable only for laboratory work, but not for the production of concentrates on a manufacturing scale.

The latex concentrates produced by the process of the present invention form a valuable new starting material for the inudustries employing rubber latex; and, since they furnish colorless, quick-drying and non-tacky films, are admirably adapted for the production of dipped and spread articles.

Example I

From a large stock of Hevea rubber latex, preserved by adding a little sodium bisulphite in the tapping cups, 1000 kgs. were treated by gradually adding 36 litres of formic acid (0.8% strength). After gently stirring for 3 hours, a coarse, yellow coagulum had formed. In order to check the progress of the coagulation, ammonia was added until titration of the latex with methyl red as indicator disclosed an alkalinity of 250 milli-equivalents per litre. The coagulum was then separated by means of a nickel sieve. The latex pretreated by partial coagulation in this manner was concentrated, by evaporation, to a content of 78.7% of dry substance, and containing only 0.4% of coagulated matter. Dry films produced from the concentrate had merely a slightly yellow tinge and low hygroscopic properties.

Example II

Rubber latex pretreated by partial coagulation with formic acid, as in the preceding example, was concentrated in the centrifuge, at 60–65° C. after the addition of 250 milli-equivalents of NH3 per litre. The resulting cream contained 61.8% of dry substance and less than 0.1% of coagulated matter. No non-reversible substances were precipitated on dilution of the cream with water. Rubber precipitated from the cream had a protein content of 0.9% and a content of 1.4% of substances soluble in acetone.

Example III

Rubber latex pretreated by partial coagulation with formic acid and subsequently rendered alkaline as in Example I, was allowed to pass a layer of active charcoal which had been steamed and slightly dried. The latex was then concentrated by evaporation in a concentrator described in the copending application Serial No. 609,660. The concentrate contained 75.6% of dry substance. The content of non-coagulable dissolved or dispersed constituents in the concentrate, based on the crepe content, was only 2.9%. The amount of irreversible matter present in the concentrate was as low as 0.2 per mille.

We claim:

1. A process for producing a relatively stable concentrated rubber latex which comprises the steps of desensitizing the latex by partially coagulating the latex, separating the coagulum therefrom as by a sieve, and treating the remaining latex with media to adsorb the non-rubber substances which tend to render the latex sensitive to coagulating influences and concentrating said desensitized latex.

2. A process for producing a relatively stable concentrated rubber latex which comprises the steps of desensitizing the latex by partially coagulating the latex, separating the coagulum therefrom as by a sieve, and treating the remaining latex with media to adsorb the non-rubber substances which tend to render the latex sensitive to coagulating influences and concentrating said desensitized latex by evaporation.

3. A process for producing a relatively stable concentrated rubber latex which comprises the steps of desensitizing the latex by partially coagulating the latex, separating the coagulum therefrom as by a sieve, and treating the remaining latex with media to adsorb the non-rubber substances which tend to render the latex sensitive to coagulating influences and concentrating said desensitized latex by centrifuging.

4. A process for producing a stable concentrated rubber latex which comprises the steps of desensitizing the latex by partially coagulating the latex and separating the coagulum therefrom as by a sieve, and concentrating the desensitized latex.

5. A process for producing a stable concentrated rubber latex which comprises the steps of desensitizing the latex by partially coagulating the latex and separating the coagulum therefrom as by a sieve, and concentrating the desensitized latex by evaporation.

6. A process for producing a stable concentrated rubber latex which comprises the steps of desensitizing the latex by partially coagulating the latex and separating the coagulum therefrom as by a sieve, and concentrating the desensitized latex by centrifuging.

7. A process for producing a stable concentrated rubber latex which comprises the steps of desensitizing the latex by partially coagulating the latex and separating the coagulum therefrom as by a sieve, and concentrating the desensitized latex by creaming.

8. A process for producing a stable rubber latex which comprises the steps of desensitizing the latex by partially coagulating it by an organic acid, separating the coagulum from the latex as by a sieve, and concentrating the desensitized latex.

9. A process for producing a stable rubber latex which comprises the steps of desensitizing the latex by partially coagulating it by a formic acid, separating the coagulum from the latex as by a sieve, and concentrating the desensitized latex.

ERNST BENZING.
JOHANNES JAENICKE.